Jan. 8, 1957  J. GERMANICH  2,776,722
ELECTRICAL VEHICLE SPEED CONTROLLER
Filed Oct. 5, 1954  2 Sheets-Sheet 1
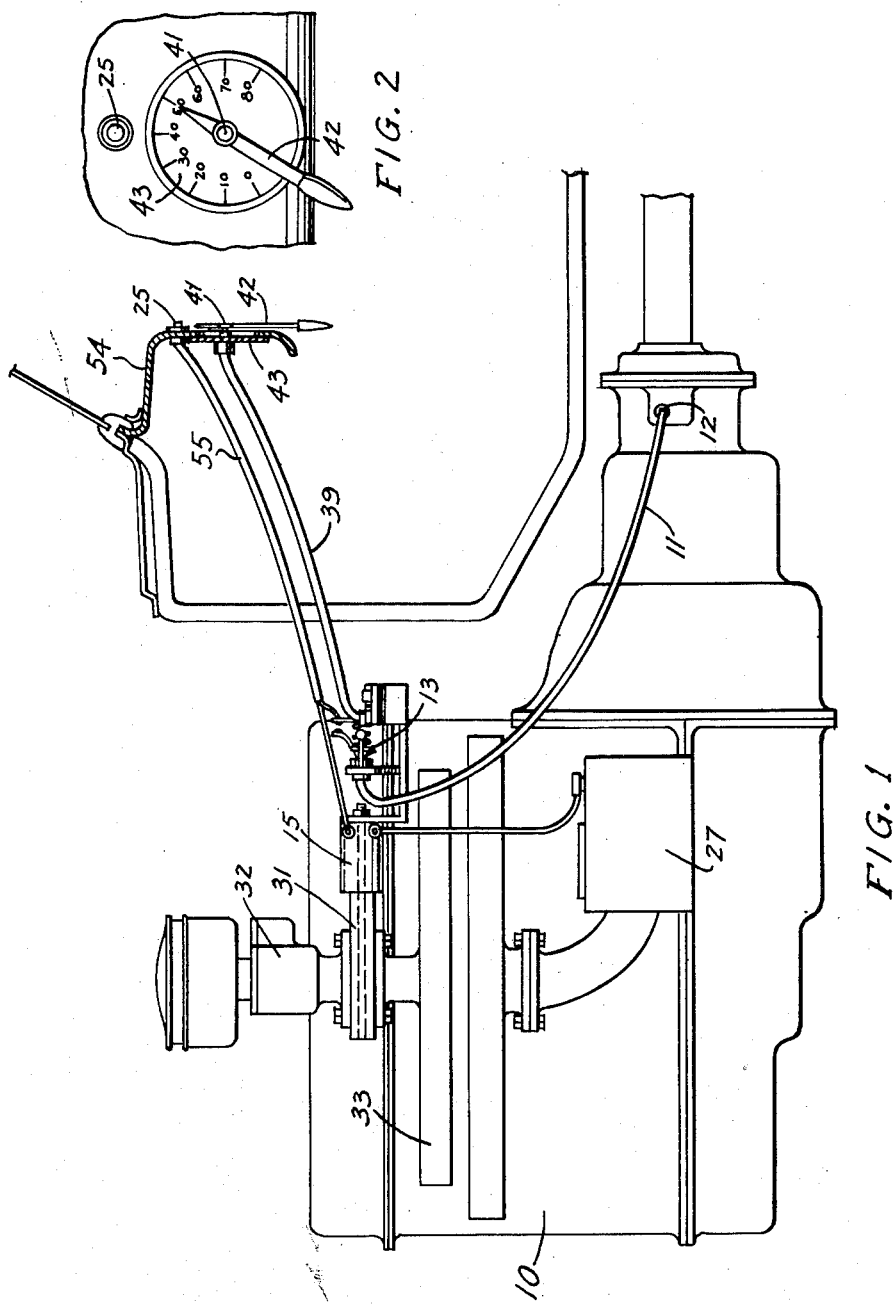
INVENTOR.
JOHN GERMANICH
BY
McMorrow, Berman & Davidson
ATTORNEYS Jan. 8, 1957  J. GERMANICH  2,776,722
ELECTRICAL VEHICLE SPEED CONTROLLER
Filed Oct. 5, 1954  2 Sheets-Sheet 2
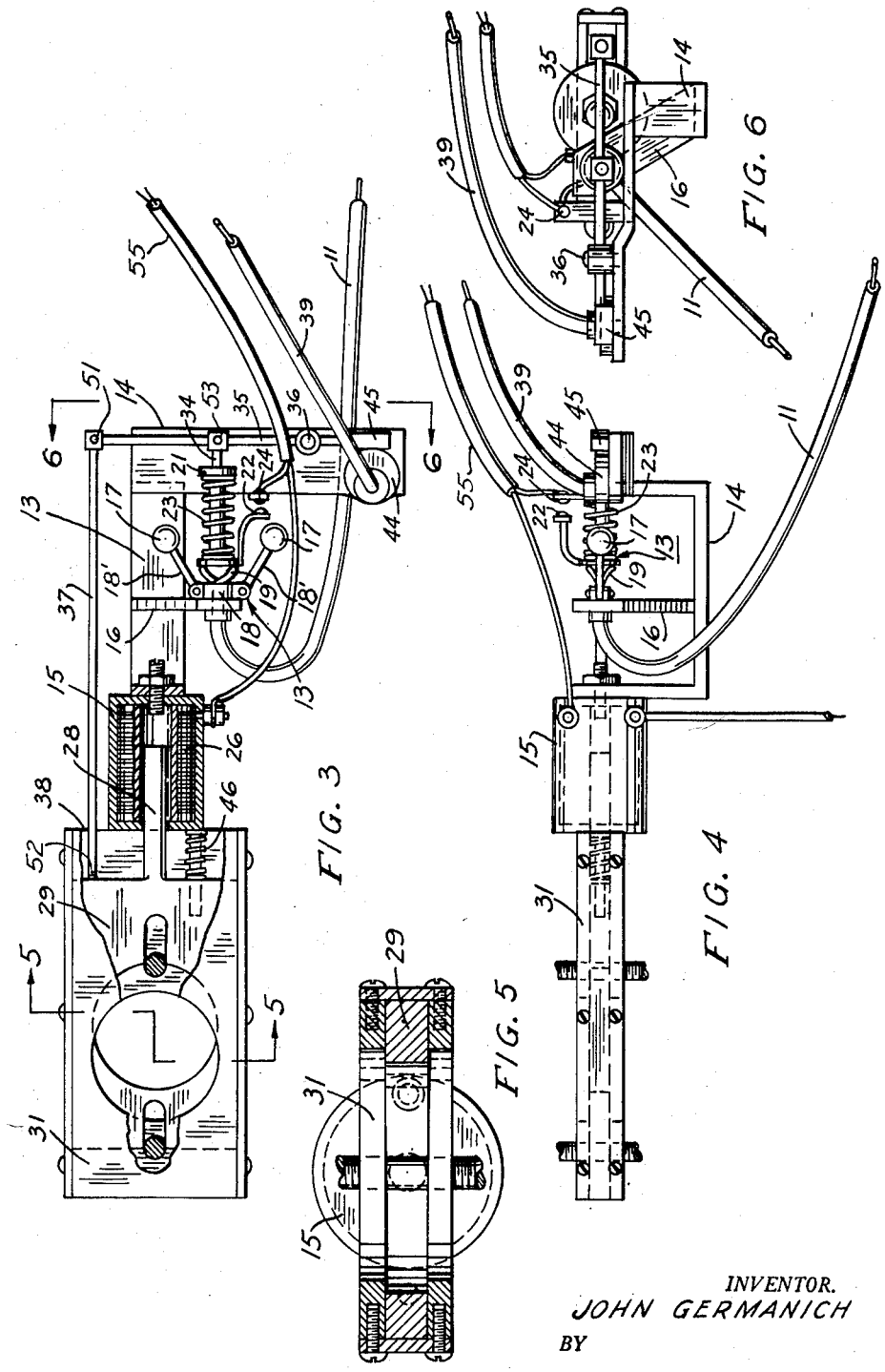
INVENTOR.
JOHN GERMANICH
BY
McMorrow, Berman + Davidson
ATTORNEYS United States Patent Office 2,776,722
Patented Jan. 8, 1957

2,776,722

ELECTRICAL VEHICLE SPEED CONTROLLER

John Germanich, Dallas, Tex.

Application October 5, 1954, Serial No. 460,300

2 Claims. (Cl. 180—82.1)

This invention relates to an electrical vehicle speed controller wherein the fuel supply connection between the carburetor and the intake manifold is closed in response to electrical means operatively connected to the speedometer drive connection of the vehicle.

The principal object of the present invention is to provide an electrical speed controller which will effectively limit the gas flow from the carburetor to the manifold of the engine upon reaching a predetermined speed.

Another object of the present invention is to provide an electrical speed controller for a vehicle which is adjustable by the operator of the vehicle and may be set at a certain rate of speed.

A further object of the present invention is to provide an electrical speed controller for a vehicle which will close the passage between the carburetor and the manifold to cause a braking effect if the vehicle exceeds the predetermined degree of speed as in rolling down a hill.

These and other objects and advantages of the present invention will be fully apparent from the following description when taken in consideration with the annexed drawings, in which Figure 1 is a side view in elevation of the present invention as secured to the engine and the dashboard of a vehicle;

Figure 2 is a plan view of a control for the dashboard of the vehicle;

Figure 3 is a cut-away view showing the valve slide and the speed controller;

Figure 4 is a side view in elevation of the present invention;

Figure 5 is an end view on line 5—5 of Figure 3; and

Figure 6 is another end view on line 6—6 of Figure 3.

Referring in greater detail to the drawings in which like numerals indicate like parts throughout the several views, an automobile engine is shown at 10 in Figure 1 showing a flexible drive shaft 11 connected to the transmission of the speedometer drive connection 12. The flexible drive shaft 11 has one end connected to a driven gear within the transmission and is connected to the governor seen broadly in Figure 1 at 13 and in greater detail in Figures 3 and 4.

The governor 13 has a block 18 which is supported for rotary movement in an upright 16 on a bracket 14 carried by a shell 15 housing a solenoid 26, and to this block 18 is connected the other end of the flexible drive shaft 11. The block 18 carries a plurality of arms 18' which are pivotally connected to the block 18, each arm carrying a weight 17. Each of the weights 17 has connected thereto another arm 19 which bears against a contact 22 movably supported on a switch body 21. The contact 22 is normally spaced from a fixed contact 24 carried by the bracket 14. Spring means or a coil spring 23 is operatively connected to the movable contact 22 for biasing it away from the fixed contact 24.

The valve plate 29 is slidably supported in the housing 31 which is interposed between the manifold 33 and the carburetor 32, and is connected to the slidable core 28 of the solenoid 26. The switch 25 operatively connects the coils of the solenoid 26 in the shell 15 to the battery 27 by means of the conductor cord 55. The switch body is connected to the valve plate 29 by means of a lever 35 which is swingably mounted intermediate its ends on a post 36 carried by the bracket 14, the switch body including a rod 34 pivotally connected to the lever 35 as at 53. One end of the lever 35 is pivotally connected as at 51 to a push rod 37 which extends through a hole 38 in the housing 31 and has one end 52 bearing against the valve plate 29 to limit the closing movement of the valve plate 29 in accordance with the set position of the cam 44. A speed indicator dial 43 is mounted on the vehicle dash 54, and a speed indicator hand 42 is movable over the dial, such hand being carried by a stub shaft 41 supported by the dash 54. The shaft 41 has drivingly connected thereto one end of a flexible drive shaft 39. The other end of the shaft 39 carries a cam 44 which bears against the portion 45 adjacent the other end of the lever 35 to shift the rod 34 of the switch body 21 to increase or decrease the tension on the spring 23 and consequently vary the degree of opening or closing movement of the valve plate 29.

In operation, the switch 25 is turned on whenever it is desired to use the speed selector and when the vehicle reaches the speed desired, the contacts 22 and 24 close and the solenoid operates to pull the core 28 to which is attached the valve slide 29 across the throat of the passage between the carburetor 32 and the manifold 33 thus limiting the gas flow therethrough and bringing the vehicle speed down to that to which it is set on the handle 42.

In the open position of switch 25, the speed control is inoperative as the slide control valve return spring 46 biases the valve slide 29 in open throttle position and the vehicle is controlled by its conventional throttle, not here illustrated as not a part of the invention.

The valve plate 29 will close the throat to effect a braking action any time the vehicle rolls down a hill at a speed greater than that to which the handle 42 is set.

While only a single embodiment of the present invention has been here shown and described, other embodiments of the present invention may be made and practiced and many changes and modifications may be made within the scope of the appended claims without departing from the spirit of the invention.

What is claimed is:

1. The combination with a vehicle having a carburetor, a manifold connected in communication with said carburetor, a transmission including a driven gear, and a flexible drive shaft having one end connected to said driven gear, of an electrical vehicle speed controller comprising a valve plate slidably supported between said manifold and carburetor, a solenoid, a core slidably mounted within said solenoid and connected to said valve plate for movement therewith, a bracket carried by said solenoid, a governor including a block having a plurality of arms pivotally connected to said block with a weight on each of said arms positioned on said bracket and having the block supported in said bracket for rotary movement, the other end of said flexible drive shaft being connected to said block, a fixed contact carried by said bracket, a speed indicator dial, a speed indicator hand movable over said dial, a switch body connected to said indicator hand for movement therewith, means movably carried by said switch body and engageable with said valve plate for controlling the limit of closing movement of said valve plate in accordance with the setting of said indicator, a contact movably supported on said switch body and normally spaced from said fixed contact, and another arm connected to each of the weights of said governor and bearing against said movable contact.

2. The combination with a vehicle having a carburetor, a manifold connected in communication with said carburetor, a transmission including a driven gear, and a flexible drive shaft having one end connected to said driven gear, of an electrical vehicle speed controller comprising a valve plate slidably supported between said manifold and carburetor, a solenoid, a core slidably mounted within said solenoid and connected to said valve plate for movement therewith, a bracket carried by said solenoid, a governor including a block having a plurality of arms pivotally connected to said block with a weight on each of said arms positioned on said bracket and having the block supported in said bracket for rotary movement, the other end of said flexible drive shaft being connected to said block, a fixed contact carried by said bracket, a speed indicator dial, a speed indicator hand movable over said dial, a switch body connected to said indicator hand for movement therewith, means movably carried by said switch body and engageable with said valve plate for controlling the limit of closing movement of said valve plate in accordance with the setting of said indicator, a contact movably supported on said switch body and normally spaced from said fixed contact, another arm connected to each of the weights of said governor and bearing against said movable contact, and spring means operatively connected to said movable contact for biasing it away from said fixed contact.

References Cited in the file of this patent

UNITED STATES PATENTS

| | | |
|---|---|---|
| 1,188,061 | Franquist | June 20, 1916 |
| 1,987,275 | Tatter | Jan. 8, 1935 |
| 2,239,328 | Kolb | Apr. 22, 1941 |
| 2,265,524 | Fruth | Dec. 9, 1941 |
| 2,273,365 | McCullough | Feb. 17, 1942 |

FOREIGN PATENTS

| | | |
|---|---|---|
| 294,496 | Great Britain | July 24, 1928 |